(12) United States Patent
Luebke et al.

(10) Patent No.: US 8,894,820 B2
(45) Date of Patent: Nov. 25, 2014

(54) ALKYLATION APPARATUS, FRACTIONATION ZONE, AND METHOD RELATING THERETO

(75) Inventors: Charles P. Luebke, Des Plaines, IL (US); David N. Myers, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 850 days.

(21) Appl. No.: 12/701,010

(22) Filed: Feb. 5, 2010

(65) Prior Publication Data

US 2011/0192712 A1    Aug. 11, 2011

(51) Int. Cl.
*B01D 3/14*       (2006.01)

(52) U.S. Cl.
CPC . *B01D 3/14* (2013.01); *Y10S 585/92* (2013.01)
USPC ........... 202/154; 202/158; 202/161; 202/172; 585/802; 585/920

(58) Field of Classification Search
USPC ......... 202/153–155, 158, 161, 172, 182, 202; 203/4, 14, 78, 84, 99, DIG. 19; 585/802, 920
See application file for complete search history.

(56) References Cited

U.S. PATENT DOCUMENTS

| | | | | |
|---|---|---|---|---|
| 3,031,384 | A | * | 4/1962 | Sirois et al. ............. 203/91 |
| 3,215,745 | A | * | 11/1965 | Frank ...................... 568/572 |
| 3,640,851 | A | * | 2/1972 | Mourier ................... 203/42 |
| 4,213,832 | A | * | 7/1980 | Zudkevitch et al. ........ 203/95 |
| 4,334,964 | A | | 6/1982 | Prezelj et al. |
| 4,544,777 | A | | 10/1985 | Hutson, Jr. et al. |
| 4,545,895 | A | * | 10/1985 | Brand et al. .............. 208/351 |
| 4,555,311 | A | * | 11/1985 | Ward ...................... 203/21 |
| 4,897,098 | A | * | 1/1990 | Pate et al. ............... 62/630 |
| 5,449,440 | A | * | 9/1995 | Rescalli et al. .......... 203/20 |
| 5,536,887 | A | | 7/1996 | Minkkinen et al. |
| 5,942,475 | A | | 8/1999 | Schlosberg et al. |
| 5,990,361 | A | | 11/1999 | Frey et al. |
| 6,107,526 | A | | 8/2000 | Frey et al. |
| 7,074,951 | B2 | | 7/2006 | Ryu et al. |
| 7,244,873 | B1 | | 7/2007 | Kleinworth et al. |
| 7,410,555 | B2 | | 8/2008 | Groten et al. |
| 7,459,593 | B1 | | 12/2008 | Krupa et al. |
| 7,601,309 | B2 | | 10/2009 | Krupa et al. |
| 2006/0065015 | A1 | * | 3/2006 | McCoy ................... 62/620 |
| 2007/0238912 | A1 | * | 10/2007 | Smith et al. ............ 585/716 |
| 2008/0161616 | A1 | | 7/2008 | Miller |
| 2008/0293860 | A1 | | 11/2008 | De Munck et al. |

OTHER PUBLICATIONS

Abstract of Lu et al., ETBE Production Technology, Petrochemical Technology, 2004, vol. 33, No. 4, p. 341.
Rivero et al., Exergy Analysis of a Reactive Distillation MTBE Unit, International Journal of Applied Thermodynamics, Jun. 2001, vol. 4, No. 2, pp. 85-92.

* cited by examiner

*Primary Examiner* — Virginia Manoharan
(74) *Attorney, Agent, or Firm* — Maryann Maas

(57) ABSTRACT

One exemplary embodiment can be a fractionation zone for an alkylation apparatus. The fractionation zone can be a column adapted to receive a feed including at least one alcohol, water, and at least one ketone. The column may provide an overhead stream including the at least one ketone and a sidestream including the at least one alcohol and water.

4 Claims, 1 Drawing Sheet

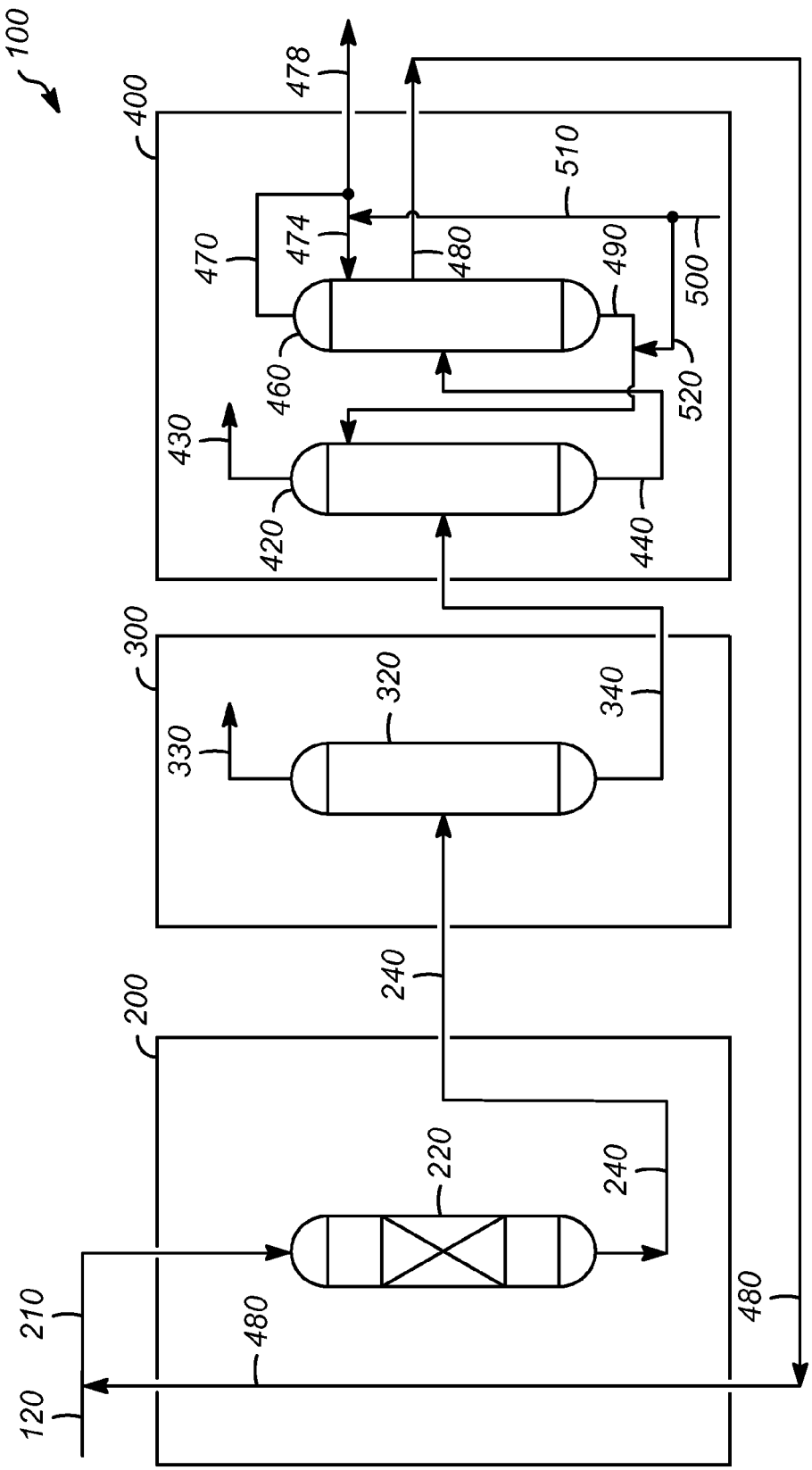

US 8,894,820 B2

ALKYLATION APPARATUS, FRACTIONATION ZONE, AND METHOD RELATING THERETO

FIELD OF THE INVENTION

This invention generally relates to alkylation, and more particularly this invention may relate to a fractionation zone for an alkylation zone.

DESCRIPTION OF THE RELATED ART

In an indirect alkylation process, a recycle stream of alcohols, such as butan-2-ol (otherwise may be referred to as secondary butyl alcohol) and 2-methylpropan-2-ol (otherwise may be referred to as tertiary butyl alcohol), and water from an alcohol stripper column can be provided to an oligomerization reactor. Generally, it is desired to provide a stream containing oxygen-based compounds, such as water and alcohols, to facilitate the oligomerization reactions. As such, a recycle stream from the overhead of the alcohol stripper column may be suitable.

However, a portion of the recycle alcohol stream may be purged from the process as a waste stream in order to limit the amount of butan-2-one (otherwise may be referred to as methyl ethyl ketone) that can be recycled back to the reactor. Particularly, excessive amounts of methyl ethyl ketone may poison the reactor catalyst. As a consequence, a portion of this recycle stream can be purged to reduce the amount of methyl ethyl ketone recycled to the reactor and extend the life of the catalyst. Often, a large volume of the overhead stream is purged to stay below, e.g., about 500 weight-ppm of methyl ethyl ketone. Generally, refiners have difficulty disposing of the alcohol purge stream. In addition, increased make-up water rates may be required to replace the water purged from the recycle overhead stream.

As a consequence, it would be desirable to have an alkylation process that minimizes the volume of the purge stream as well as, correspondingly, reduce the make-up water required for the one or more reactors. Furthermore, minimizing this waste stream can enhance the environmental compatibility of the process unit.

SUMMARY OF THE INVENTION

One exemplary embodiment can be a fractionation zone for an alkylation apparatus. The fractionation zone can be a column adapted to receive a feed including at least one alcohol, water, and at least one ketone. The column may provide an overhead stream including the at least one ketone and a side-stream including the at least one alcohol and water.

Another exemplary embodiment can be an alkylation apparatus. Generally, the alkylation apparatus includes an oligomerization zone and a fractionation zone. The oligomerization zone can include at least one reactor adapted to receive a feed including at least one C3-C5 olefin. The fractionation zone may include an alcohol stripper column and communicate with at least a portion of a product stream from the oligomerization zone. Typically, the alcohol stripper column provides an overhead stream including a ketone and a side-stream including the at least one alcohol and water with at least a portion of the side-stream recycled to the oligomerization zone.

Yet a further embodiment may be a method of removing a catalytic poison from an oligomerization reactor. Additionally, the method may include separating in a fractionation zone an overhead stream including butan-2-one and a side-stream including at least one of alcohol and water.

The embodiments disclosed herein can provide a column separating at least a portion of the methyl ethyl ketone from the one or more alcohols. The recycled side-stream can have a reduced amount of methyl ethyl ketone and the overhead stream can be purged from the apparatus. Thus, the overhead stream from the column can act as a purge stream, as opposed to purging a portion of the recycled stream to the reactor. As such, the purged volume of material can be reduced and potential environmental impacts lessened.

DEFINITIONS

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules or the abbreviation may be used as an adjective for, e.g., compounds.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "alkene" and "olefin" may be used interchangeably.

BRIEF DESCRIPTION OF THE DRAWING

FIG. 1 is a schematic depiction of an exemplary alkylation apparatus.

DETAILED DESCRIPTION

An alkylation apparatus 100 can include an oligomerization zone 200, a first fractionation zone 300, and a second fractionation zone 400. As depicted, process flow lines in the figures can be referred to as streams, feeds, or products. Particularly, a line can contain one or more streams, feeds, or products, and one or more streams, feeds, or products can be contained by a line.

Typically, the oligomerization zone 200 can receive a combined feed 210, including a feed 120 and a recycled side-stream 480 as described hereinafter, provided to at least one oligomerization reactor 220 to produce a product stream 240. Typically, the feed 120 can include at least one C3-C5 alkene. A water-soluble oxygenate such as an alcohol with at least three carbons and preferably a tert-butyl alcohol and/or a sec-butyl alcohol also may be added to the oligomerization reactor 220. One exemplary apparatus for oligomerizing olefins is disclosed in, e.g., U.S. Pat. No. 7,244,873 B1.

Generally, any suitable catalyst can be used in the at least one reactor 220. Suitable catalysts can include one or more protonic acids. The preferred acids may have a Hammett acidity function of no more than about −4.0. Examples of a catalyst falling into this category can include a phosphoric acid catalyst. Such a solid phosphoric acid catalyst may have a Hammett acidity function of no more than about −5.0. Another preferred catalyst may be a sulfonic acid ion-exchange resin catalyst. Generally, this resin catalyst includes one or more sulfonic acid groups and can be prepared by polymerizing or copolymerizing aromatic vinyl compounds followed by sulfonating. Examples of aromatic vinyl compounds may include styrene, vinyl toluene, vinyl naphthalene, vinyl ethylbenzene, methyl styrene, vinyl chlorobenzene, and vinyl xylene. An acidic ion-exchange resin can contain about 1.3- about 2.0 sulfonic acid groups per aromatic group. Preferred resins are those based on copolymers of aromatic monovinyl compounds and aromatic polyvinyl compounds and, in particular, divinyl compounds in which the concentration of polyvinyl benzene may be approximately about 1- about 20%, by weight, of the copolymer. Preferably, the particle size of the ion-exchange resin is approximately about 0.15- about 2 mm. Furthermore, perfluorosulfonic acid resins consisting of copolymers of sulphonylfluorovinyl ethyl and fluorocarbon compounds can be used. The concentration of the catalyst can be about 0.01- about 20%, preferably about 0.1- about 10% based on weight of the catalyzed mixture.

The oligomerization reaction zone 200 can operate at any suitable conditions, such as a temperature of about 0-250° C., preferably about 40-150° C., a pressure of about 340- about 3,500 kPa, preferably about 1,300- about 2,500 kPa, and a liquid hourly space velocity (hereinafter may be abbreviated "LHSV") of about 0.5- about 8 $hr^{-1}$, preferably about 1- about 6 $hr^{-1}$.

The fractionation zone 300 can include a first column 320, which can be a debutanizer column. The first column 320 may receive the product stream 240 and provide an overhead stream 330 and a bottom stream 340. The overhead stream 330 can be withdrawn from the alkylation apparatus 100 while the bottom stream 340 can be provided to the second fractionation zone 400. The bottom stream 340 can include at least one alcohol, water, and at least one ketone.

Generally, the first column 320 operates at any suitable conditions, such as a temperature of about 30- about 210° C., and a pressure of about 400- about 1,100 kPa, preferably about 500- about 900 kPa, to separate one or more C4-C5 hydrocarbons.

The second fractionation zone 400 can include a first column 420 and a second column 460, which can be an alcohol stripper column. The first column 420 receives the bottom stream 340, which can include at least a portion of the product stream 240 from the oligomerization zone 200. Often, the first column 420 provides an overhead stream 430 and a bottom stream 440, which can act as a feed to the second column 460. Typically, the bottom stream 440 includes at least one alcohol, water, and at least one ketone. The second column 460 can provide an overhead stream 470 including at least one ketone. The overhead stream 470 can be split into a reflux 474 and a purge stream 478. In addition, the second column 460 can provide the side-stream 480 including at least one alcohol and water and at least a portion, typically all, can be recycled to the oligomerization zone 200. Optionally, a purge stream (not shown) can be taken from the side-stream 480 to minimize the amount of any ketones remaining in the side-stream 480. In addition, the column 460 can provide a bottom stream 490 that can include substantially water. In addition, a make-up condensate stream 500 can be provided to the second column 460. Typically, the make-up condensate stream 500 can be split into a portion 510 provided to the reflux 474 and a portion 520 provided to the bottom stream 490. Typically, the bottom stream 490 can be recycled back to the first column 420.

Generally, the overhead stream 470 includes at least about 3%, about 8%, about 10%, or even about 12%, by weight, of at least one ketone, such as methyl ethyl ketone, based on the weight of the overhead stream 470. Moreover, the overhead stream 470 can include no more than about 50%, preferably no more than about 30%, and optimally no more than about 25%, by weight, water based on the overhead stream 470. As such, the amount of methyl ethyl ketone, which can poison a catalyst, may be reduced in the side-stream 480 and recycled back to the oligomerization zone 200. Particularly, the side-stream 480 may have a reduced amount of methyl ethyl ketone, such as no more than about 6%, preferably no more than about 5%, and optimally no more than about 3%, by weight, of at least one ketone, such as methyl ethyl ketone. Moreover, the second column 460 can be designed or modified to include additional trays or operated at such conditions, e.g., greater reflux, to enhance the separation of components in the overhead stream 470 and the side-stream 480. This removed material would typically be less than a purge stream of the combined overhead stream and side-stream. Suitable conditions for the columns 420 and 460 can include, independently, a temperature of about 20- about 210° C. and a pressure of about 30- about 1,100 kPa. In one preferred embodiment, the second column 460 can operate at a temperature of about 117° C. and a pressure of about 80 kPa.

EXAMPLES

The following examples are intended to further illustrate the subject embodiments. These illustrations of embodiments of the invention are not meant to limit the claims of this invention to particular details of these examples. The examples are based on ensuing calculations and actual operating experience with similar processes.

The runs are simulated at generally the same conditions. The Comparison Example is based on an apparatus 100 and column 460 similar to that depicted in FIG. 1, except the side-stream 480 is eliminated and the stream 478 is recycled back to the oligomerization zone 200, with a purge taken from the stream 478. The Example is consistent with the embodiments disclosed herein, such as the apparatus 100 including the column 460 with a side-stream 480 as depicted in FIG. 1. The feed, overhead, side-stream, and bottom streams discussed in the tables below pertain to the third column in a series, such as the column 460 depicted in FIG. 1. The compound abbreviations are tertiary butyl alcohol (TBA), secondary butyl alcohol (SBA), methyl ethyl ketone (MEK), isopropyl alcohol (IPA), and water ($H_2O$). The balances, such as mass balances, in the tables below may not match due to rounding.

TABLE 1

| Properties and Components | Comparison Example | | | Example | | | |
|---|---|---|---|---|---|---|---|
| | Feed | Overhead | Bottom | Feed | Overhead | Side-stream | Bottom |
| Mass Flow (kg/hr) | 16,000 | 890 | 15,000 | 16,000 | 200 | 500 | 15,000 |

TABLE 1-continued

| Properties and Components | Comparison Example | | | Example | | | |
|---|---|---|---|---|---|---|---|
| | Feed | Overhead | Bottom | Feed | Overhead | Side-stream | Bottom |
| Enthalpy (kJ/kg) | −15,000 | −9,700 | −15,000 | −15,000 | −6,900 | −7,200 | −15,000 |
| TBA (mass fraction) | 0.012 | 0.21 | 0.00 | 0.012 | 0.35 | 0.24 | 0.00 |
| SBA (mass fraction) | 0.015 | 0.26 | 0.00 | 0.015 | 0.30 | 0.35 | 0.00 |
| IPA (mass fraction) | 0.00 | 0.0008 | 0.00 | 0.00 | 0.0012 | 0.0009 | 0.00 |
| MEK (mass fraction) | 0.0031 | 0.056 | 0.00 | 0.0031 | 0.12 | 0.050 | 0.00 |
| H2O (mass fraction) | 0.97 | 0.47 | 1.00 | 0.97 | 0.22 | 0.36 | 1.00 |

Furthermore, the simulation also measures the fluid flow in other streams to and from the columns as well as other streams in the apparatuses. These simulated fluid flow amounts are depicted in Table 2 below:

TABLE 2

| Stream | Comparison Example (kg/hr) | Example (kg/hr) |
|---|---|---|
| Column Feed | 16,000 | 16,000 |
| Overhead Stream (Purge) | | 200 |
| Side-stream | | 500 |
| Overhead Stream (Alcohol Purge and Recycle) | 890 | |
| Alcohol Purge | 450 | |
| Alcohol Recycle | 440 | |
| Column Bottom | 15,000 | 15,000 |
| Make-up Water | 450 | 260 |

As depicted, the overhead stream acting as a purge stream in the Example withdrawn from the alkylation apparatus 100 can be substantially reduced, e.g., by about 55%, by weight, of the Comparison Example. Furthermore, the make-up water stream to the oligomerization reactor in the Example can be substantially reduced, e.g., by about 40%, by weight, of the Comparison Example.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A fractionation zone for an alkylation apparatus, comprising:
    A) a debutanizer column having a debutanizer feed inlet, a debutanizer overhead conduit, and a debutanizer bottoms conduit for withdrawing a stream comprising at least one alcohol, water, and at least one ketone from the debutanizer column;
    B) a first column having a first column feed inlet in fluid communication with the debutanizer bottoms conduit, a first column overhead, a first column bottoms stream, and a first column recycle inlet; and
    C) a second column having a second column inlet in fluid communication with the first column bottoms stream to receive a stream comprising the at least one alcohol, the water, and the at least one ketone from the debutanizer, a second column overhead conduit for a stream comprising the at least one ketone, a side-stream conduit for a stream comprising the at least one alcohol and water, and a second column bottoms conduit in fluid communication with the first column recycle inlet;
    wherein the second column overhead conduit for a stream comprising the at least one ketone is split into a reflux conduit and a purge conduit; and
    wherein the side-stream conduit is in fluid communication with an oligomerization reactor.

2. The fractionation zone according to claim 1, wherein the second column bottoms conduit is further in fluid communication with a water conduit for a stream comprising substantially water.

3. A fractionation zone for an alkylation apparatus, comprising:
    a first fractionation zone including: a debutanizer column having an inlet for receiving a product steam, an overhead stream, and a bottoms stream comprising at least one alcohol, water, and at least one ketone; and,
    a second fractionation zone including: a first column having a first column feed inlet in fluid communication with the debutanizer bottoms conduit, a first column overhead, a first column bottoms stream, and a first column recycle inlet; and, a second column having a second column inlet in fluid communication with the first column bottoms stream to receive a stream comprising the at least one alcohol, the water, and the at least one ketone, a second column overhead stream comprising the at least one ketone, a side-stream comprising the at least one alcohol and water, and a second column bottoms in fluid communication with the first column recycle inlet;

wherein the second column overhead conduit for a stream comprising the at least one ketone is split into a reflux conduit and a purge conduit; and wherein the side-stream conduit is in fluid communication with an oligomerization reactor.

4. The fractionation zone of claim 3 wherein the second column in the second fractionation zone comprises an alcohol stripper.

* * * * *